Aug. 23, 1966     K. E. MURPHREE     3,268,247
PIPE JOINT CONSTRUCTIONS AND METHODS OF MAKING
THE SAME OR THE LIKE
Filed Dec. 17, 1962

INVENTOR
KENNETH E. MURPHREE
BY Glenn, Palmer &
Matthews
HIS ATTORNEYS

United States Patent Office 3,268,247
Patented August 23, 1966

3,268,247
PIPE JOINT CONSTRUCTIONS AND METHODS OF MAKING THE SAME OR THE LIKE
Kenneth E. Murphree, Florence, Ala., assignor to Reynolds Metals Company, Richmond, Va., a corporation of Delaware
Filed Dec. 17, 1962, Ser. No. 245,292
4 Claims. (Cl. 285—286)

This invention relates to improved pipe joint constructions and to improved methods for making such pipe joint constructions.

It is well known that it is rather difficult to provide high tensile strength joints between dissimilar metal pipes and the like, such as copper and aluminum pipes, without utilizing expensive and time-consuming coupling means.

However, according to the teachings of this invention, relatively high tensile strength joints can be provided between two lengths of such pipes or the like in a relatively simple manner without utilizing expensive coupling means.

Therefore, it is an object of this invention to provide improved pipe joint constructions having one or more of the novel features of this invention.

Another object of this invention is to provide improved methods for making such constructions or the like.

Other objects, uses and advantages of this invention are apparent from a reading of this description, which proceeds with reference to the accompanying drawings forming a part thereof and wherein.

Figure 1:
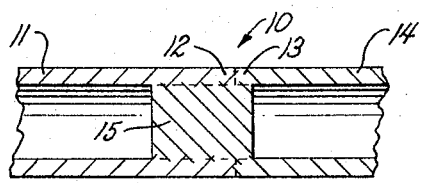
FIGURE 1 is a cross-sectional view illustrating one of the pipe joint constructions of this invention.

While the various features of this invention are hereinafter described and illustrated as being particularly adaptable for securing together lengths of copper and aluminum pipes, it is to be understood that the various features of this invention can be utilized to secure together other dissimilar metal pipes or like metal pipes, as desired.

Therefore, this invention is not to be limited to the embodiments thereof illustrated in the drawings, because the drawings are merely utilized to illustrate one of the wide variety of uses of this invention.

Further, while the terms "copper" and "aluminum" are utilized throughout the specification and claims, it is to be understood that such terms refer to the metal in its natural state or any alloys thereof.

Referring now to FIGURE 1, an improved pipe joint construction of this invention is generally indicated by the reference numeral 10 and comprises a length of copper pipe 11 having an end 12 secured to an end 13 of a length of aluminum pipe 14 in a manner hereinafter described, the ends 12 and 13 of the copper pipe 11 and aluminum pipe 14 being further secured together at the interior surfaces thereof by an aluminum insert 15 in a manner hereinafter described.

It is well known that an end of a copper pipe can be flash welded to an end of an aluminum pipe in a relatively simple and non-time-consuming manner.

However, it has been found that such prior-known flash welding operation does not produce a sufficiently high tensile strength joint between the copper and aluminum pipes.

Therefore, by utilizing the insert 15 of this invention, it has been found that a relatively high tensile strength joint can be formed between the copper and aluminum pipes in substantially the same length of time as the prior-known flash welding operation, whereby the pipe joint construction 10 of this invention can be produced in an economical manner without requiring expensive and time-consuming coupling means.

Figure 2:
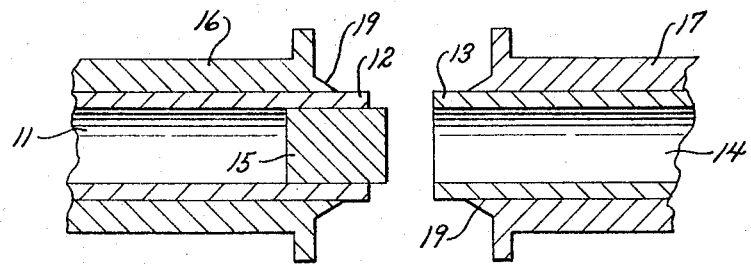
FIGURE 2 is an axial cross-sectional view illustrating one of the steps of the method of this invention for forming the pipe joint construction of FIGURE 1.

In particular, reference is made to FIGURE 2, wherein the ends 12 and 13 of the copper pipe 11 and aluminum pipe 14 are tightly held in conventionally split holding chucks 16 and 17 through which a suitable electrical current can be passed to effect a flash welding operation in a manner hereinafter described.

Before the pipes 11 and 14 are flash welded together, the substantially solid, cylindrical aluminum insert 15 has the major portion thereof inserted into the end 12 of the copper pipe 11 in the manner illustrated in FIGURE 2, whereby a portion of the insert 15 extends outwardly from the end 12 of the copper pipe 11 for a predetermined distance and is adapted to be telescopically received in the end 13 of the aluminum pipe 14 in a manner hereinafter described, the projecting portion of the insert 15 being so located that the same does not adversely affect the subsequent flash welding operation between the ends 12 and 13 of the copper pipe 11 and aluminum pipe 14.

Figure 3:
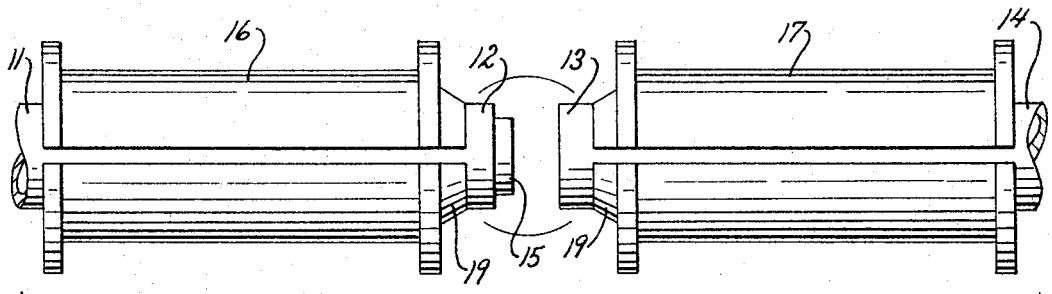
FIGURE 3 is a side elevation view similar to FIGURE 2.

After the pipes 11 and 14 have been tightly clamped in the holding chucks 16 and 17 and the insert 15 has been properly placed in the end 12 of the copper pipe 11, a suitable electrical current is passed to the holding chucks 16 and 17 so that when the ends 12 and 13 of the pipes 11 and 14 are brought closely adjacent each other in the manner illustrated in FIGURE 3 the electrical arcing between the ends 12 and 13 of the pipes 11 and 14 rapidly heats up the ends 12 and 13 in a matter of a few seconds. The heated ends 12 and 13 of the pipes 11 and 14 can be subsequently moved together under pressure by the holding chucks 16 and 17 in the manner illustrated in FIGURE 4 to fuse or flash weld the ends 12 and 13 of the pipes 11 and 14 together while simultaneously flash welding the insert 15 to the interior surfaces of the ends 12 and 13 of the pipes 11 and 14 as the end 13 of the pipe 14 is telescopically received over the projecting portion of the insert 15 in the manner illustrated in FIGURE 4, the electrical current being supplied to the holding chucks 16 and 17 usually being terminated during such pressure step.

Figure 4:
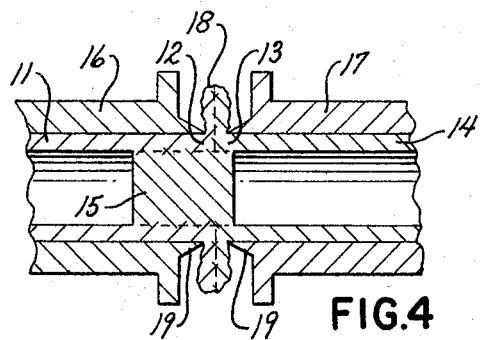
FIGURE 4 is an axial cross-sectional view similar to FIGURE 2 and illustrates another step in the method of this invention.

As illustrated in FIGURE 4, a certain amount of the metal at the fused ends 12 and 13 of the pipes 11 and 14 is upset outwardly, as indicated by the reference numeral 18 in the region of the welded seams between the pipes 11 and 14.

Figure 5:
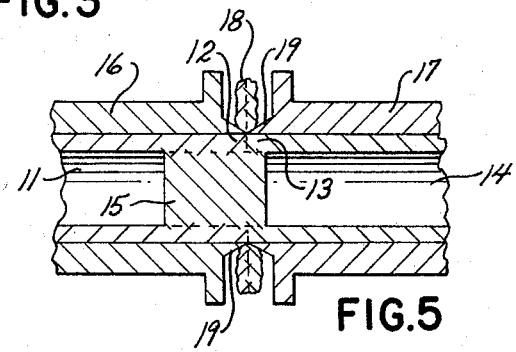
FIGURE 5 is a view similar to FIGURE 4 and illustrates the pinch-off step of the method of this invention.

This upset metal 18 can be removed in any suitable manner, and, in the embodiment illustrated in the drawings, the holding chucks 16 and 17 respectively have outwardly directed cutting edges 19, which pinch off the upset metal 18 in the manner illustrated in FIGURE 5 when the cutting edges 19 of the holding chucks 16 and 17 are subsequently moved together over the welded seam of the pipes 11 and 14.

After the upset metal 18 has been removed, the holding chucks 16 and 17 are disconnected from the pipes 11 and 14, whereby the pipe joint assembly has the configuration illustrated in FIGURE 1. Therefore, not only are the ends 12 and 13 of the pipes 11 and 14 flash welded together, but also the insert 15 is flash welded to the interior surfaces of the ends 12 and 13 of the pipes 11 and 14 and bridges the welded seam between the ends 12 and 13 thereof, to provide a relatively strong joint between the pipes 11 and 14.

Should it be desired to interconnect the interior of the copper pipe 11 with the interior of the copper 14 for any desired purpose, the welded insert 15 can be subsequently bored or otherwise provided with suitable passage means interconnecting the interior of the copper pipe 11 with the interior of the copper pipe 14.

Alternately, the insert 15 can be originally formed with such bore before the same is flash welded to the pipes 11 and 14 in the above manner.

While the embodiment of the pipe joint construction 10 illustrated in FIGURE 1 was formed by having the major portion of the insert 15 initially disposed in the end 12 of the copper pipe 11, it is to be understood that the major portion of the insert 15 can be disposed in the end 13 of the aluminum pipe 14 before the ends 12 and 13 of the pipes 11 and 14 are flash welded together in the manner illustrated in FIGURES 2–5.

Figure 6:
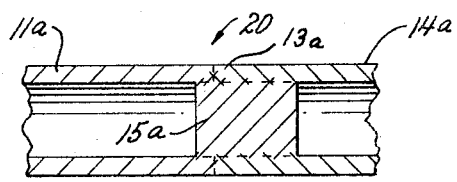
FIGURE 6 is a view similar to FIGURE 1, illustrating another pipe joint construction of this invention.

For example, reference is made to FIGURE 6, wherein another pipe joint construction of this invention is indicated by the reference numeral 20, wherein parts thereof similar to the parts of pipe joint construction 10 illustrated in FIGURE 1 are indicated by like reference numerals followed by the reference letter "a."

In the pipe joint construction illustrated in FIGURE 6, the pipes 11a and 14a were flash welded together in substantially the same manner as that illustrated in FIGURE 1, except that the insert 15a was initially disposed in the aluminum pipe 14a, with an end thereof projecting outwardly from the end 13a of the aluminum pipe 14a the desired distance before the pipes 11a and 14a were flash welded together.

If desired, the insert of this invention can be so constructed and arranged that the same has an overall length that does not require a major portion thereof to be inserted in either the copper pipe or the aluminum pipe so that it makes no difference into which pipe the insert is first placed before the pipes are flash welded together, because a sufficient length thereof will project outwardly from the end of the pipe in which it is placed to produce the desired flash welding effect.

Figure 7:
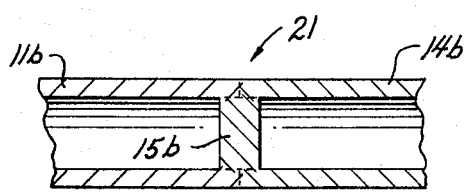
FIGURE 7 is a view similar to FIGURE 1 and illustrates still another pipe joint construction of this invention.

For example, reference is made to FIGURE 7, illustrating another pipe joint construction of this invention, indicated generally by the reference numeral 21 and having parts thereof similar to the parts of the pipe joint construction 10 of FIGURE 1, indicated by like reference numerals followed by the reference letter "b."

As illustrated in FIGURE 7, the insert 15b is equally disposed relative to the seam of the flash welded pipes 11b and 14b, whereby it makes no difference into which pipe 11b or 14b the insert 15b was first placed before the same were flash welded together.

Therefore, it can be seen that this invention provides improved pipe joint constructions and improved methods for making such pipe joint constructions or the like.

In particular, it was found that by flash welding a 1¼ inch schedule 40 aluminum pipe of aluminum alloy 1100 H 19 to an electrolytic hard drawn copper pipe without utilizing the insert of this invention, the tensile strength of the joint therebetween was between 12,750 p.s.i. to 14,250 p.s.i.

However, when an aluminum plug insert of 1100 F alloy and of approximately 1¼ inch in length was utilized in the manner illustrated in FIGURE 6, and according to the teachings of this invention the tensile strength of the resulting pipe joint construction was between 18,750 p.s.i. to 19,018 p.s.i.

Further, when such an aluminum plug insert was utilized in the manner illustrated in FIGURE 1, and according to the teachings of this invention the tensile strength of the resulting pipe joint construction was between 22,010 p.s.i. to 23,750 p.s.i.

In performing the above operations, the initial die opening was approximately 1¼ inches while the final die opening was approximately 0.032 of an inch. The flash off was approximately 1⅛ inches with the upset approximately 9/16 of an inch.

The clamping pressure of the holding chucks 16 and 17 was approximately 600 p.s.i. while the initial flash welding pressure was approximately 30 p.s.i. and the final flash welding pressure was approximately 44 p.s.i. The pipes were held in the holding chucks 16 and 17 approximately 10 seconds after the weld was completed.

Accordingly, it can be seen that the various pipes of this invention can be secured together in a relatively short period of time and by relatively unskilled labor to produce high tensile strength joints heretofore unattainable in the art.

While the various pipe constructions of this invention have a wide variety of uses, the copper and aluminum pipe constructions of this invention are readily adaptable for forming the movable contact arms of relatively large and relatively high voltage disconnect switches and the like by subsequently machining and shaping the pipe construction.

For example, a relatively short copper pipe can form the contact end of the contact arm while a relatively long aluminum pipe interconnected to the copper pipe in the above manner can form the major portion of the contact arm.

It it is desired to insert a member or members through the resulting contact arm, the insert utilized to secure together the adjacent ends of the copper and aluminum pipes can be suitably bored or the like to provide suitable passage means between the pipes for receiving such member or members.

Therefore, it can be seen that the resulting contact arm has the copper and aluminum portions thereof joined together by the teachings of this invention whereby a relative high tensile strength joint is provided between the copper and aluminum pipes to provide a durable and long lasting contact arm.

While the form of the invention now preferred has been disclosed as required by the statutes, other forms may be used, all coming within the scope of the claims which follow.

What is claimed is:

1. A method for joining a length of copper pipe to a length of aluminum pipe comprising the steps of inserting an insert in one end of one of said pipes, and flash welding said one end of said one pipe to an end of the other pipe while flash welding said insert to the interior surfaces of said ends of said pipes.

2. A method for joining a length of copper pipe to a length of aluminum pipe comprising the steps of inserting a portion of a substantially cylindrical insert in one end of said copper pipe whereby a predetermined length of said insert extends from said one end of said copper pipe, and flash welding said one end of said copper pipe to an end of said aluminum pipe while flash welding said insert to the interior surfaces of said ends of said pipes.

3. A method for joining a pair of lengths of pipes together comprising the steps of flash welding the end of one of said pipes to the end of the other of said pipes, and flash welding an insert disposed in said pipes respectively to said ends of said pipes.

4. In combination, a first length of pipe having an end, a second length of pipe having an end, flash weld means joining said end of said second pipe to said end of said first pipe, an insert disposed in said pipes, and flash weld means joining said insert to said ends of said pipes.

(References on following page)

References Cited by the Examiner

UNITED STATES PATENTS

| | | | |
|---|---|---|---|
| 376,750 | 1/1888 | Murphy | 285—397 |
| 1,313,387 | 8/1919 | Kaarbo | 285—22 |
| 2,745,797 | 5/1956 | Long | 285—286 X |
| 2,762,904 | 9/1956 | Thomas | 285—256 X |
| 2,816,211 | 12/1957 | Hutchins | 285—397 |
| 2,823,933 | 2/1958 | Hickman | 285—173 |
| 2,926,030 | 2/1960 | Rozmus | 285—286 |
| 2,949,319 | 8/1960 | Hutchins | 285—173 |

FOREIGN PATENTS 287,005  3/1928  Great Britain.

CARL W. TOMLIN, *Primary Examiner.*

S. R. MILLER, T. F. CALLAGHAN,
*Assistant Examiners.*